July 16, 1929.  E. A. NELSON  1,721,278

MULTIPLE WHEEL STRUCTURE

Filed April 10, 1925

INVENTOR.
EMIL A. NELSON
BY
ATTORNEY.

Patented July 16, 1929.

1,721,278

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

MUTIPLE-WHEEL STRUCTURE.

Application filed April 10, 1925. Serial No. 22,153.

My invention relates to multiple wheels and particularly to those of the multiple disc type embodying a plurality of parallel disc wheel constructions operating upon a common wheel axis and usually upon a common wheel hub.

Its prime object is to produce a structure of extreme lightness without impairing in any degree the sturdiness of and durability of a light disc wheel.

A further object is to achieve a multiple wheel structure having an extended width of wheel tread whereby to insure reliability of operation over irregular ground.

A still further object is to embody in a multiple wheel structure of this type disc wheels having tapered wheel discs frusto conical in shape, which are known to possess very meritorious riding and working qualities and which it has not been heretofore feasible to embody in structures in which the objects above set forth are obtained.

Figure 1:
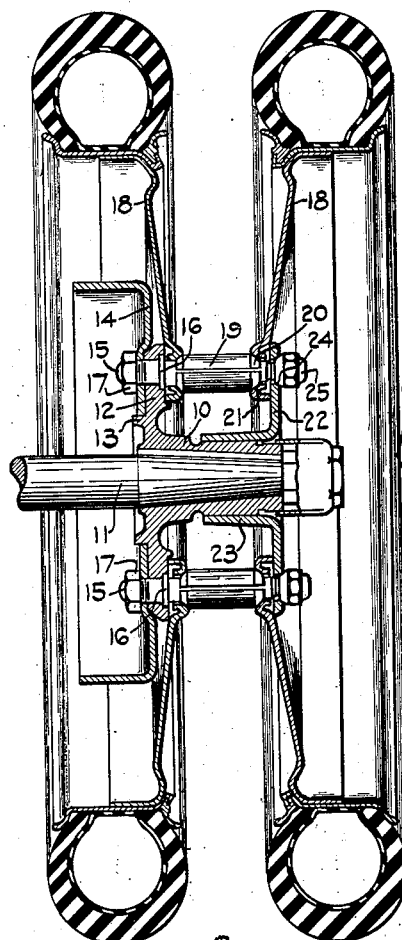
Figure 3:
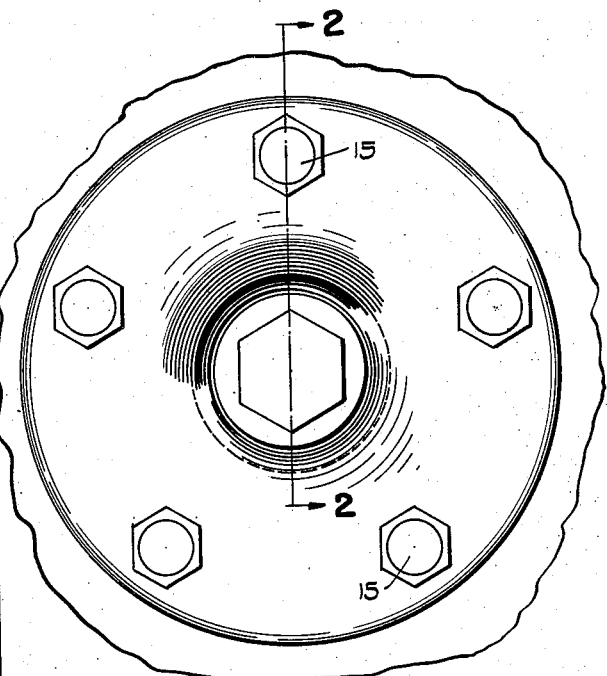
Figure 2:
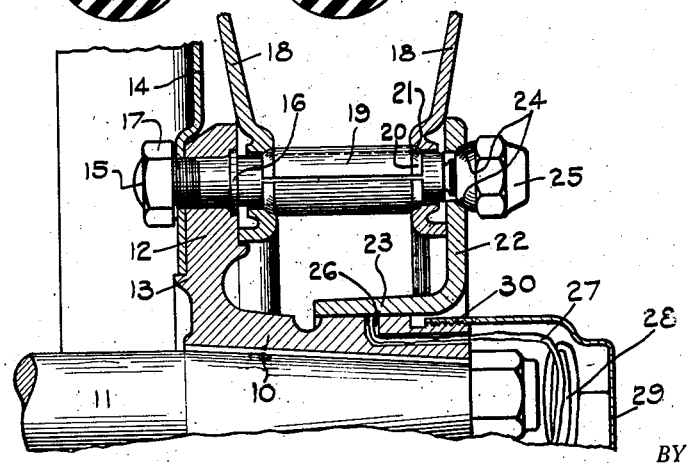

The preferred form of my invention is disclosed in the accompanying drawings of which Figure 1 is an axial transverse section of the multiple wheel structure; Fig. 2 is an enlarged detail view of a part of the hub portion of this section; and Fig. 3 is an enlarged outside end view of the hub portion of the structure substantially on the scale used in Fig. 2.

Numeral 10 is the hub which is illustrated as the driving hub keyed upon driving axle 11. This hub is substantially of a standard form of hub used in connection with a single disc wheel. It is here that a subordinate object of my invention is achieved in the utilization of standard single wheel equipment in building up a multiple disc wheel. This standard hub is provided with a radial flange 12 having an inturned inner shoulder 13. On the inner face of this flange and centered by the shoulder 13 is mounted a brake drum 14. Anchored to the hub on a bolt circle centered in the axis 11 is a series of studs 15. The anchoring is by means of a flange 16 on the stud socketed on the exterior of the radial flange 12 of the hub and drawn home by means of a nut 17 on the threaded end of the stud projecting through the radial flange 12 and the body of the brake drum 14. These features, too, are embodied in standard construction.

But according to my invention I extend these studs axially outwardly substantially for the length of the body of the hub 10. On them I mount a plurality of demountable disc wheels 18 having their bodies spaced apart substantially throughout their entire extent. In other types of wheels, especially heavy duty wheels, it has been the practice to clamp several demountable disc wheels together and to a hub flange by means of a single securing means drawing their inner portions closely together. But according to my invention I space them apart.

The spacing means is in the form of a split sleeve 19 positioned on the studs intermediate the discs during their assembly on the studs. These sleeves have conical ends 20 which complementally engage conical sockets 21 formed in annular series in the wheel discs corresponding to the annular series of the studs 15. The sockets 21 are, in fact, coined in the upset portion of the central area of the discs by means of the borders of which the discs are borne upon the hub.

The inner disc 18 bears directly against the outer face of the radial flange 12 by these borders, the inner ends of the conical sockets 21 being free from the inner face as clearly appears. The outer disc 18 is borne similarly upon an auxiliary flange 22 preferably of pressed metal. This auxiliary flange or annular member is provided with an integral inwardly extending tubular boss 23 constituting a bearing of the flange upon the outer body of the hub 10. The outer body and this bearing 23 are machine fitted together so that flange 22 is properly axially aligned. Flange 22 is provided with an annular series of apertures in register with those of the disc 18 which it bears and an inner face properly formed to receive the borders of the upset portion 22 of the disc. The apertures in flange 22, however, are like those in the discs themselves, conically formed from the exterior as at 24.

The outer ends of the studs 15 which pass through these apertures are provided with conical nuts 25 bearing in these seats 24. By turning home these conical nuts, the entire structure, hub 10, radial flange 12, studs 15, inner disc 18, spacers 19, outer disc 18 and auxiliary radial flange 22 are clamped tightly together and provide a structure of great rigidity and sturdiness. The conical formations on the discs, the spacers, the radial flanges and the nuts together effectually align all of the parts, effectually center them with respect to the driving axis, and effectually eliminate both lost motion and all tendency to work loose.

The inner disc wheel 18 projects inwardly housing the brake drum 14, while the outer disc wheel projects outwardly, spacing the rims of the wheels apart a distance still greater than the centers, since both discs are conical in the direction in which the wheels project.

With but slight modification and the addition of merely the elongated studs 15, the spacers 19, and the flange 22, only a standard equipment of the single disc wheel is needed to produce this multiple wheel. It renders this wheel essentially cheap to manufacture, most readily assembled and knocked down, and gives it a remarkable degree of adaptability. To remove either disc wheel one has only to remove the single set of nuts 25 on the exterior of the outer wheel, no greater in number than those usually provided for a single wheel, and then to slip off the flange 22.

In order to provide against possible setting of this flange 22 on the hub 10 through corrosion, the introduction of foreign substances, or the like, I provide an annular groove 26 (shown in detail in Fig. 2) on the exterior of the body of the hub at the same time this body is machined, and introduce lubricant to this channel by a wick 27 the body 28 of which is housed within the hub cap 29. This hub cap is threaded on the outer end of the hub structure as usual, but the end portion 30 is slightly reduced in diameter whereby the threads are spaced apart from the interior of boss 23 and the presence of this boss does not interfere with the application of the hub cap in any way. The interior of the cap contains lubricant which may be placed therein or which, when the hubs contain lubricated anti-friction bearings, may receive lubricant from the hubs.

Each of the several modifications of which my invention may be found capable of is intended to be covered in the annexed claims:

What I claim is:—

1. A multiple disc wheel comprising a hub, a pair of wheel discs spaced apart throughout their extent, axially extending through-bolts connecting them together and to the hub, and spacing means surrounding the bolts between the discs and gripping the bolts when the bolts are fast.

2. A multiple wheel comprising a wheel hub, a pair of wheel discs spaced apart throughout their extent and having tapered sockets therein, through-bolts in the sockets to draw them together, and spacers in the form of split sleeves surrounding said through-bolts and clamped to the through-bolts through engagement of their ends within the tapered sockets.

In testimony whereof I hereunto affix my signature.

EMIL A. NELSON.